Nov. 17, 1936.　　　H. W. FALK　　　2,060,803
MEANS FOR TREATING GEARS
Filed Aug. 14, 1933　　　4 Sheets-Sheet 1
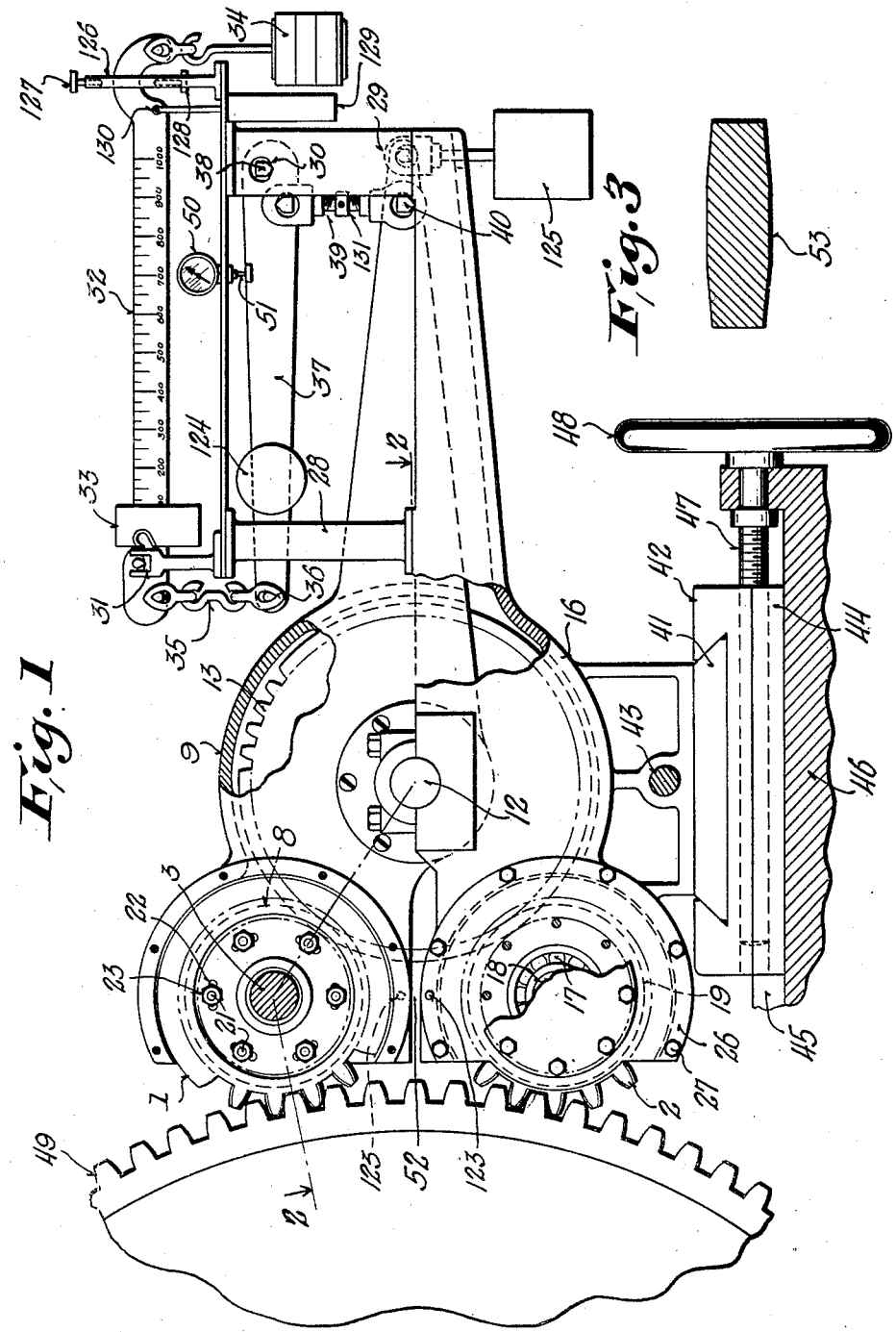

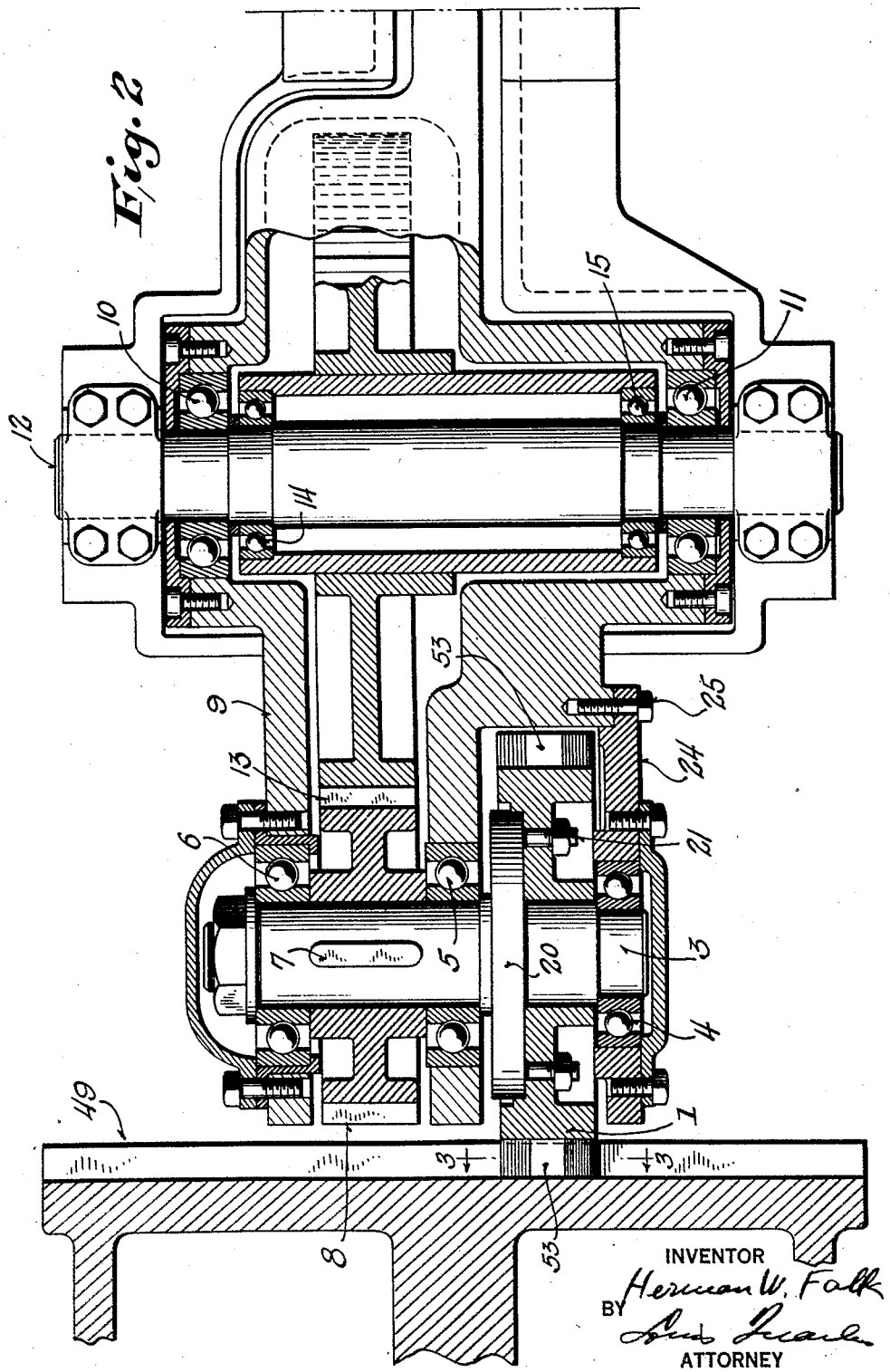

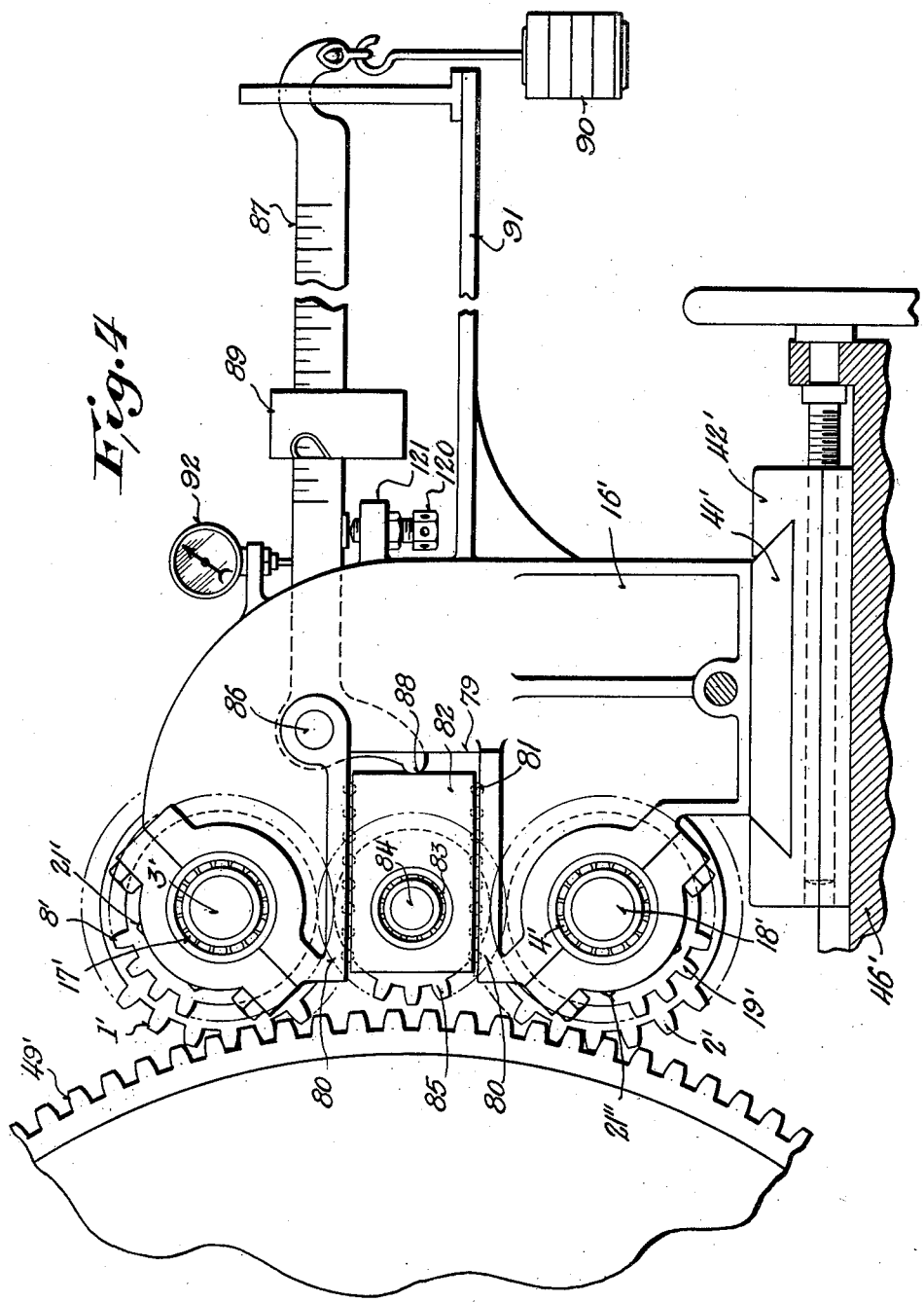

Nov. 17, 1936.  H. W. FALK  2,060,803
MEANS FOR TREATING GEARS
Filed Aug. 14, 1933  4 Sheets-Sheet 4
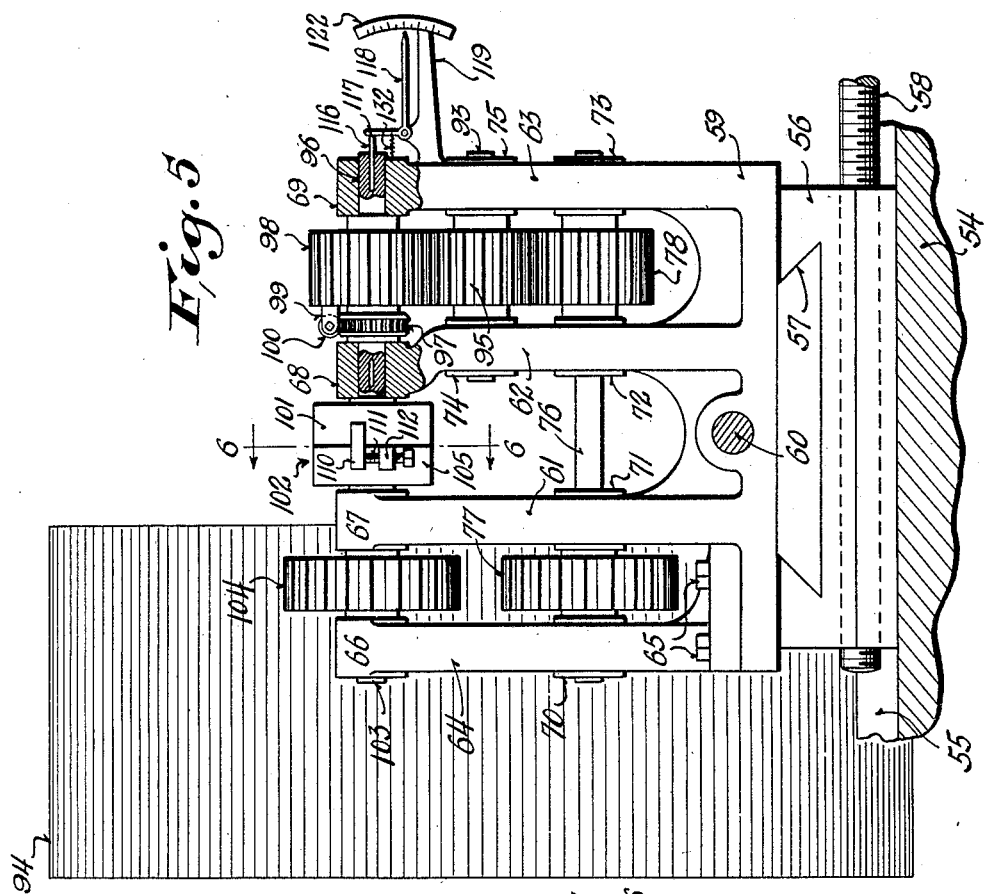
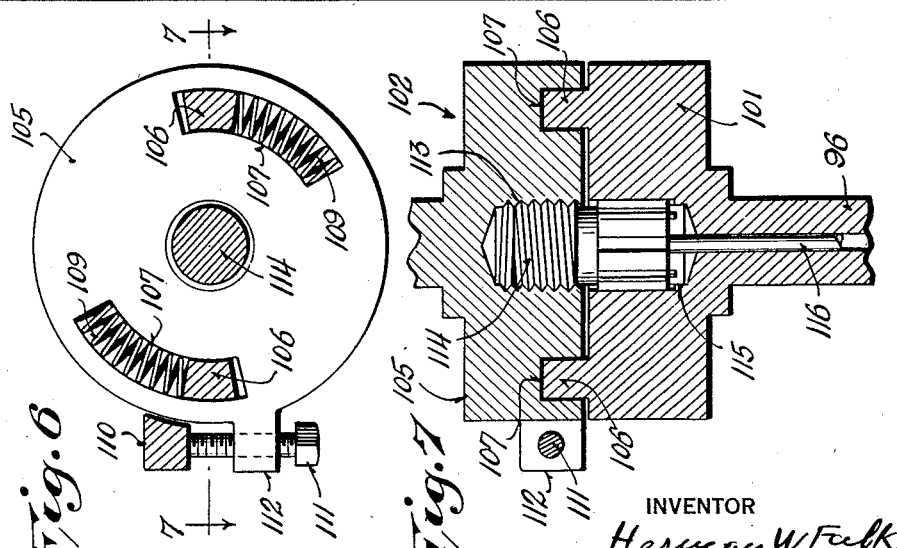
INVENTOR
Herman W. Falk
BY Louis Quarles
ATTORNEY Patented Nov. 17, 1936

2,060,803

UNITED STATES PATENT OFFICE 2,060,803

MEANS FOR TREATING GEARS

Herman W. Falk, Milwaukee, Wis., assignor to Falk Corporation, Milwaukee, Wis., a corporation of Wisconsin Application August 14, 1933, Serial No. 684,947

8 Claims. (Cl. 73—51)

This invention relates to a means for testing, proving and finishing gears.

The means applies a known stress to individual gear teeth faces, said stress being applied along the line upon which stress in normal use will occur and while so applying said stress reapplies the reaction thereof to the gear in an opposing couple while the resulting deformation of the tooth in relation to an arbitrarily chosen point of reference upon the gear being tested may be measured, or, as a variation thereof, it applies no more than a contacting pressure to individual teeth, the noting of any abnormal dimensional departures of the surface of said teeth being contacted from a reference point and, further sometimes may be used in applying stress with such intensity that finishing or burnishing of the tooth face is accomplished, and also may be used in selectively lapping with the help of a fine abrasive wherein motion limiting means prevent the loading and consequent lapping of areas below a selected contour, said operations being performed, if necessary or desirable, as a dynamic operation while the gear being tested is rotating.

The proving of gears for mechanical strength has heretofore been an unsatisfactory and difficult task, usually accomplished by running said gear in mesh with its intended mate under conditions of power transmission, sometimes as an adjunct to the operation of finishing or burnishing. While testing by transmission the waste of power is notable. This is particularly true in the case of reduction gearing employed in connection with marine prime movers, which gearing is designed at times to have a capacity in excess of 30,000 H. P. If such gearing is to be proven at 300 per cent overload before placing in service, it is necessary in a transmission test to have a testing equipment with a capacity of 90,000 H. P. The reservation of such substantial capacity for the occasional testing of a gear is prohibitive. For this reason such large capacity marine gearing has, in the past, been left to actual service as a proof thereof, in spite of the disastrous and expensive nature of a failure at sea.

Heretofore the testing of gears for dimensional irregularities has been accomplished by optical methods or by extremely laborious scaling, in which an enormous number of measurements must be made. This method often results in the rejection of gears which are entirely serviceable. The reason for this is that dimensional errors are of several kinds, such, for example, as eccentricity, indexing, tooth contour, etc. Frequently such errors are compensating and it is only under conditions simulating the running of the gear that it is possible to determine whether said errors are detrimental to the quiet running or serviceability of the gear.

This invention, however, through very simple means, makes possible the proving of gears of any size, statically or dynamically, to any degree desired with the expenditure of no more than a nominal amount of power. Further, the means of this invention permit the measuring and testing of a gear dimensionally, in such a manner that only those errors in dimension which detract from the successful functioning of the gear are indicated. The means of this invention further make possible the formation of glazed or burnished finishes on tooth faces in short intervals of time and with the expenditure of very little power. This invention provides means also whereby selective lapping of gear teeth in contrast to the general lapping heretofore known, may be carried on, making possible a final correction of tooth contour heretofore unattainable. For one or all of the above reasons apparatus of this invention is useful in the treatment of gears of any size from the gears of precision instruments, such as watches, to gears of the largest size.

In obtaining dynamic testing, proving, lapping and finishing, with the means of this invention, the gear being treated is caused to rotate and to drive an intermeshing, resisting pinion. The resisting pinion is drivingly coupled with the rotating gear so that a driving reaction resulting from the resisting action and equal thereto is communicated to some point of reference on the gear to be treated, in a regenerative manner. This point of reference may be a fixed point on the gear being treated or may be a movable point, such as successive teeth. The coupling means employed are of such nature that the resistance and reaction are subject to regulation.

The great usefulness of this invention, therefore, arises out of the fact that any degree of opposition, that is to say resistance and consequently equal reaction, may be had without influencing the net torque applied to the gear being treated and without prohibiting the rotation of the same at any speed desired. There being no net torque imposed by the equal resistance and reaction, the power required to rotate the gear being treated need only be great enough to overcome friction. In this manner dynamic treating of gearing at very high loads may be obtained with the expenditure of very little power.

Simple and effective forms of apparatus embodying this invention are described by reference to the drawings, wherein Fig. 1 is a side view, with portions broken away, of one form of this invention;

Fig. 2 is a sectional view taken on the plane 2—2 of Fig. 1;

Fig. 3 is a detail section of a tooth taken at the line 3—3 of Fig. 2;

Fig. 4 is a side view of another form of this invention;

Fig. 5 is a front view of another form of this invention;

Fig. 6 is a detail sectional view of the coupling of the machine shown in Fig. 5, taken at the plane 6—6 of Fig. 5;

Fig. 7 is a detail sectional view of the coupling of Fig. 6, taken at a plane 7—7.

The apparatus as shown in Figs. 1 and 2 consists of two pinions, a resisting or opposing pinion 1 and a reacting pinion 2, which are mounted to rotate in synchronism. Synchronism is obtained by carrying pinion 1 upon shaft 3 which, as shown clearly in Fig. 2, is mounted to rotate in bearings 4, 5 and 6. The shaft 3 is rigidly keyed by key 7 to a pinion 8. The bearings 4, 5 and 6 are rigidly attached to a beam 9 which is mounted on bearings 10 and 11 which in turn are carried by a stationary gudgeon shaft 12. A gear 13 mounted on bearings 14 and 15 meshes with pinion 8 and rotates about the center of gudgeon shaft 12 so that pinion 8 remains in constant mesh with gear 13 regardless of the position of beam 9. As a support for the machine and as means for carrying the stationary gudgeon shaft 12 is a bed 16 which carries bearings similar to those which support shaft 3, one of which, numbered 17, is indicated in Fig. 1. These bearings, including bearing 17, support for rotation a shaft 18 which carries rigidly secured thereto the pinion 2. Likewise mounted on the shaft 18 and rigidly secured thereto is a pinion 19, shown in dotted lines, which meshes with the gear 13. The pinion 19 has the same number of teeth and the same diameter as pinion 8 and the opposing and reacting pinions 1 and 2 are of the same diameter and bear the same number of teeth. In this way, as long as beam 9 is substantially stationary, resistor and reactor pinions 1 and 2 must remain synchronized.

As shown clearly in Fig. 2, the shaft 3 carries as an integral part thereof a wide collar 20, into which collar studs 21 are secured. Pinion 1 is provided with a series of slotted holes 22 so that the angular relation between the teeth of pinions 1 and 2 may be adjusted to any position desired by the use of clamping nuts 23. The pinion 2 is secured in similar fashion to the shaft 18 so that replacement of pinions 1 and 2 with others of different tooth form or pitch may be made. To facilitate this change the beam 9 is provided with a removable portion 24, held in position by means of bolts 25. The bed 16 is likewise provided with a removable portion 26 which is held in place by means of bolts 27.

Extending to the right of the gudgeon shaft 12 is a portion of the bed 16 which serves as a support for the loading mechanism. The loading mechanism comprises standards 28 and 29 upon which the fixed fulcrums 30 and 31 are supported. A graduated beam 32 rests upon fulcrum 31 and through weights 33 and 34 loads the linkage 35 to any definite degree desired. The linkage 35 through pivot 36 loads the lever 37, which in turn is supported on its pivot 38 on the fulcrum 30. Secured to the lever 37 is a counterweight 124, which is properly proportioned and positioned to counterbalance the levers 37 and 32. The lever 37 being loaded a definite, known amount loads the connecting member 39 and exerts a known load upon the pivot 40 which is an integral part of the beam 9. The beam 9 is also counterweighted to offset the heavy weight of the pinions at the working end of the machine. This is accomplished by hanging a properly adjusted weight 125 on the end of the beam 9.

The bed 16 carries a dovetailed foot 41 which is fitted to slide in a guideway 42. The bed 16 is also drilled and adapted to threadingly receive the screw 43 which is rotatably mounted in a projection of guide 42, not shown, so that the screw will rotate therein without longitudinal movement and traverse the bed 16. Guide 42 is also provided with a dovetailed foot 44 which is fitted to slide in a guideway 45 in the foundation 46. The guideway 42 is drilled and adapted to threadingly receive a screw 47 which is mounted in a projection of the foundation 46 to rotate therein without longitudinal movement and traverse the guideway 42 at right angles to the movement of bed 16. Screws 43 and 47 are provided with means for turning the same, for example, as shown in the handwheel 48 which is attached to screw 47.

Means, not shown, are provided for mounting for rotation a gear to be treated, designated 49. Said gear is mounted in such position that through the manipulation of screws 43 and 47 pinions 1 and 2 may be brought into mesh with the gear 49. This operation is facilitated by locking beam 9 against movement with respect to bed 16, loosening nuts 23 and removing all backlash by adjusting pinion 1 in the slotted holes 22 and then clamping the nuts 23. In order to indicate the movements of beam 9 after adjustment of the pinions 1 and 2 to gear 49 any point of reference in the loading system may be observed. A convenient way of accomplishing this is by means of an ordinary extensometer gauge 50 which is rigidly attached to the support of the loading system. The feeler 51 of the gauge bears upon the lever 37. It may also be convenient to attach an extensometer gauge to the studs 123, shown in Fig. 1.

It will be observed that the width of pinions 1 and 2 is narrow as compared with the tooth face of the gear 49 and further, as indicated in Figs. 2 and 3, the teeth of pinions 1 and 2 are relieved or cut away so that a bearing or contacting area 53 bears upon the teeth of gear 49. In this way without excessive loading of the beam 9 very large stresses per unit length of tooth contact may be obtained. The beam 32 projects through a controlling standard 126 which is provided with adjusting screws 127 and 128. The latter may very conveniently be employed as motion-limiting means during the operation of selective lapping, or the same may be electrically connected to a warning signal to indicate when a gear being tested exceeds the prescribed tolerance.

The smoothness with which the apparatus functions can be enhanced by the addition of a dashpot 129, the latter being connected at 130 with the beam 32 to dampen the movement thereof. The dashpot is preferably adjustable to any degree of dampening desired so that appropriate dampening may be had for any degree of loading. The link 39 is also advantageously provided with a turn-buckle or right hand-left hand coupling 131 so that deflections of the various parts may be compensated for.

In operating the device above described it is convenient to place a small block of rigid material in the nip 52 between the beam 9 and the bed 16 and to place sufficient weights 33 and 34 upon the loading system to hold the beam relatively stationary with respect to the bed. The proper pinions 1 and 2 for the gear 49 to be treated, which may be any form of gear, helical or spur, involute or cycloidal, etc., are then selected and put into place, as described above. By means of the handwheel 48 the pinions 1 and 2 are brought into mesh with the gear 49 and all back-lash removed at the slotted holes 22, as previously described. The weights 33 and 34 are then reduced so that the block in the nip 52 can be removed. The screw 43 is then manipulated to position the pinions 1 and 2 at either one side or the other of the broad tooth face of gear 49. If it is desired to determine whether the gear 49 will withstand a given load per unit length of tooth contact the appropriate weighting of weights 33 and 34 is applied. The gear 49 is then placed in rotation and while it is rotating the screw 43 is manipulated so that the contact area 53 of pinions 1 and 2 is applied over the entire face of gear 49. While this is carried on the extensometer is carefully observed. If any tooth or any part of a tooth of gear 49 is not strong enough to withstand the load placed thereon the deflection of said weaker part will be immediately indicated by the extensometer. Of course, if the gear 49 has a very serious defect this will be even more apparent because failure will result.

The above proving of the gear presupposes dimensional accuracy in the gear 49, or at least a knowledge of any dimensional inaccuracies therein. Knowledge as to this may easily be obtained as follows: The machine is set up and the gear to be tested put into place, as described above. This having been done the arrangement of weights 33 and 34 is adjusted so that pinions 1 and 2 remain firmly in contact with the teeth of gear 49, but without imposing an appreciable stress thereon. The gear 49 is then rotated and screw 43 manipulated and the deflections indicated by the extensometer noted. Providing the dimensional form of gear 49 is perfect the extensometer will remain stationary. The extensometer, however, will indicate no deflection in case compensating dimensional errors occur in the gear. In either case the extensometer will indicate a dimensionally sound and useable gear. If, however, dimensional variations which will interfere with the proper running of the gear are present they will be indicated and located.

This invention is also useful in performing a new form of lapping which for convenience is herein termed "selective lapping". Selective lapping means the removal of small protrusions beyond the prescribed gear contour by abrasive action. This is accomplished by this invention, as for instance in the above described machine, by inserting a gauge block in the nip 52, placing a moderate load upon the beam 32 and then rotating gear 49 while applying a fine abrasive compound thereto. The gauge block is so dimensioned that it supports all of the load placed on beam 32 when the gears 1 and 2 are in mesh with a theoretically perfect gear 49. In other words, the teeth of said gears 1 and 2 will approach gear 49 to contact therewith, but without the imposition of any load thereon. If, however, gear 49 is not perfect, protrusions beyond the prescribed contour will force the gears 1 and 2 apart and open the nip 52 to an extent proportional to the protrusion and what is more important, transfer the load upon beam 32 to the gear 49. The transfer of the load from the gauge block to the gear 49, whenever a protrusion occurs, and the return of the same to the gauge block whenever the gear lies within the prescribed contour, provides a selective means for causing the abrasive between the gear 49 and the gears 1 and 2 to become active only against protruding parts. In this way a gear 49 having slight imperfections may be quite quickly and easily corrected without the usual objectionable general reduction of subcontour, as well as protruding areas, which occurs to an appreciable extent in the old form of lapping. It will be seen that selective lapping provides a means for the final correction of minute dimensional errors which heretofore could not be corrected.

As a further field of usefulness for this invention, the teeth of the gear 49 may be finished or burnished by simply making the loading of weights 33 and 34 sufficient so that a friction-reducing finish will be produced on the teeth of gear 49 when the latter is rotated for a moderate length of time. The gauge block is, of course, removed during burnishing.

A form of the apparatus of this invention which may be convenient to construct and use under certain conditions is shown in Fig. 4. This form of device is mouted on the usual bed 46' upon which is slidably mounted a saddle 42', which carries the dovetailed foot of a main frame 16'. Main frame 16' is provided with removable shafts 3' and 18' which are mounted in bearings 17' and 4'. Firmly secured to shaft 3' to rotate therewith is a gear 8'. Gear 8' has affixed therein a plurality of studs 21'. Secured to shaft 3' to rotate therewith by means of studs 21' is the gear 1', the latter having a root diameter slightly greater than the external diameter of gear 8'.

Similarly mounted on shaft 18' and affixed thereto to rotate therewith is the gear 19', the latter being provided with a plurality of studs 21''. Also mounted upon shaft 18' and secured thereto to rotate therewith by means of studs 21'' is the gear 2'. The gears 1' and 2' are of equal diameter and tooth contour and are selected to properly mesh with a gear 49' which is to be treated. Gear 49' is appropriately mounted for rotation and is provided with means for rotating the same, all of which are not shown.

The main frame 16' is provided with a guide opening 79, the same being arranged symmetrically about a line drawn perpendicularly to the line joining the centers of shafts 3' and 18' and at the midpoint thereof. The upper and lower lips 80 of the guide opening 79 are longitudinally grooved to provide raceways for the anti-friction balls 81. The balls 80 are maintained in spaced relationship by means of perforated retainer plates. A grooved U-shaped block 82 is movably mounted between the rows of balls 81, the same being constrained to longitudinal movement thereby. The block 82 is bored to receive the bearings 83, in which is rotatably mounted the shaft 84. Mounted to turn upon the shaft 84 is the opposing pinion 85, the same being of proper diameter and contour to mesh with both gears 8' and 19'.

The main frame 16' is also bored to receive a gudgeon shaft 86 upon which is pivotally carried the lever 87. Lever 87 is provided with a knuckle 88 which bears upon the U-shaped block 82, urging the same toward the left of the figure. The other end of lever 87 is graduated in the manner of a scale beam and carries a movable weight 89, this latter being adjustable in relation to the graduations on the lever 87 to produce known forces upon the block 82. In addition to the weight 89, the end of the lever 87 is provided with a support for additional weights 90. As a means for protecting the lever 87 support 91 is provided, the latter being firmly secured to the main frame 16'.

Above the lever 87 and firmly secured to the main frame 16' is mounted a standard extensometer 92, the feeler of which reaches downwardly and bears upon the upper surface of lever 87.

The apparatus as shown in Fig. 4 is so arranged that the teeth of gear 1' resist the turning of gear 49' in a clockwise direction. This resistance is conveyed through gears 8' and 85 to gear 19' and thence back through gear 2' to gear 49' in a direction opposite to the resisting force of gear 1' and equal thereto. The amount of resisting and aiding may be regulated to any desired degree by the adjustment of the weights 89 and 90. The measurement of dimensional variations in the gear 49' is possible with the use of the extensometer 92.

The apparatus shown in Fig. 4 is also provided with a motion limiting screw 120, the latter being threadedly supported in projection 121 extending outwardly from the main frame 16'. Screw 120 is useful in performing the operation of selective lapping, in which case it is positioned to limit the downward movement of the beam 87.

In operating the apparatus shown in Fig. 4 for the determination of dimensional accuracy of gear 49', a moderate load is placed upon beam 87 and the reading indicated by extensometer 92 observed. The gear 49' is then rotated and the entire tooth surfaces thereof explored. Any detrimental dimensional variations in gear 49' will be reflected in a compensating movement indicated by the gauge 92. To employ the apparatus to prove the mechanical strength of gear 49' any desired load may be imposed thereon by the adjustment of weights 89 and 90. The gear 49' is then rotated and explored and any unusual deflections thereof will be immediately indicated at gauge 92. To perform the operation of selective lapping a moderate load is placed upon beam 87 and the adjusting screw 120 brought to such a position that gears 1' and 2' impose no load upon the gear 49' at a position where the gear 49' is known to be accurate. A fine abrasive is then applied to gear 49' and the gear rotated while the main frame 16' is moved laterally to treat the entire surface. The operation of burnishing is performed by appropriately loading beam 87, the screw 120, of course, having been withdrawn. The gear 49' is then rotated and treated over its entire surface with or without the use of a lubricant.

Figs. 5, 6 and 7 show another form of the apparatus of this invention, useful at times in carrying out the methods thereof. This form provides for the mounting of a gear 94 so that the same may be rotated. Driving means for gear 94 are not shown and may comprise a driving connection with the shaft upon which said gear is mounted or may consist in a driving gear which meshes directly with the gear 94, the latter being a desirable expedient in all forms of this invention in the event gear 94 is a long slender pinion. Positioned rigidly with respect to the mounting of gear 94 is a bed 54 having a guideway 55 running parallel with the axis of gear 94. Fitted to slide in said guideway 55 is a saddle 56 which is also provided with a guideway 57 transversely arranged thereto. The saddle 56 is bored and threaded to receive a traversing screw 58 which is rotatably secured in bed 54. Mounted upon saddle 56 and arranged to slide in the guideway 57 thereof is a frame 59, the latter being bored and threaded to receive the traversing screw 60. The traversing screw 60 is rotatably secured in saddle 56 by means not shown.

The frame 59 is provided with three fixed bearing supports 61, 62 and 63, and a removable support 64, which is held in place by bolts 65. The four supports are provided with two series of bearings in alignment, indicated by the numerals 66, 67, 68, 69 and 70, 71, 72, 73, respectively, the axes of the same being parallel with the axis upon which gear 94 rotates. The supports 62 and 63 are provided with additional aligned bearings 74 and 75, the same being positioned equidistant from bearings 68 and 72 and 69 and 73, respectively.

Mounted to turn in bearings 71, 72, 73 and 74 is the shaft 76 upon which is secured the treating pinion 77 and the transmission pinion 78. Mounted to turn in bearings 74 and 75 in the jack shaft 93 upon which is carried intermediate pinion 95 the latter being in mesh with pinion 78. Mounted to turn in bearings 68 and 69 is the shaft 96 to which is secured a worm gear 97. Also carried on shaft 96 to turn thereon is a transmission pinion 98. Pinion 98 is provided with a pair of projecting ears 99 which are positioned to carry the worm 100 in mesh with the worm gear 97. The transmission pinion 98 has the same number of teeth as pinion 78 and is in mesh with intermediate pinion 95 also.

Secured to the end of shaft 96 which projects through bearing 68 is the male portion 101 of a torsion coupling 102. Mounted to turn in bearings 66 and 67 is the shaft 103 to which is secured the treating pinion 104. The end of shaft 103 which projects beyond bearing 67 carries the female portion 105 of the torsion coupling 102. The torsion coupling 102 is shown in detail in Figs. 6 and 7, Fig. 6 being a transverse section at the center thereof. In Fig. 6 can be seen in section the lugs 106 of the male portion 101. The lugs 106 project into circular openings 107 which contain springs 109. The overhanging lug 110 which is an integral part of the male portion 101, is likewise shown in section in Fig. 6, in position to be engaged by motion-limiting screw 111, which is threadedly held in projection 112 which is an integral part of portion 105 of the coupling.

Referring now to Fig. 7 in which a longitudinal section of the coupling 102 is shown, it can be seen that portion 105 is provided with a centrally placed threaded recess 113. Within recess 113 and threadedly engaging the same is a bolt 114 which is provided with a splined portion at the end opposite the threaded portion. The splined portion extends into a splined recess 115 in portion 101 so that it will turn therewith and slide therein. Secured to the bolt 114 is an indicator rod 116 which extends through an opening provided in shaft 96 beyond the end of the same, as shown clearly in Fig. 5. The end of indicating rod 116 is brought to a conical point and bears against a pivot bearing 117 on the end of bent indicating lever 118. The indicating lever 118 is pivotally mounted in a projection 119 of the bearing support 63. Also secured to support 119 is a reference scale 122. The pivot bearing 117 is urged against the conical tip of rod 116 by a spring 132.

In operating the form of this invention described above and shown in Figs. 5, 6 and 7, appropriate treating pinions 77 and 104 are selected and secured to shafts 76 and 103. In doing this, of course, it is necessary to remove the removable bearing support 64. The traversing screws are then manipulated to bring the treating pinions in contact with the gear 94 and by adjusting worm 100 said treating pinions are brought into proper mesh with gear 94. The worm 100 is then turned so that a slight torsional load is created in the system, the same being indicated by the indicator lever 118. The gear 94 is then rotated and the entire surface explored while observing indicator lever 118. If dimensional errors are present in gear 94 the same will be evidenced by the movement of indicator lever 118. If it is desired to prove the gear 94 for strength, the worm 100 is rotated to establish any degree of torsion in the system desired, the same being indicated by the deflection of indicator 118. The gear 94 is then explored over its entire surface.

If burnishing of gear 94 is desired an appropriate torsion in the system is established and the gear rotated. Selective lapping may also be obtained by establishing a moderate torsion in the system while the treating pinions 104 and 77 are in contact with a portion of gear 94 which is known to be accurate. While in this position motion-limiting screw 111 is turned until it contacts overhanging lug 110. Abrasive is then applied to the gear 94 and the gear rotated.

The employment of pinions narrower than the face of the gear to be treated is a convenience, but not essential to obtaining the benefit of this invention, in obtaining high unit stresses, for proving purposes, without the necessity for building a very massive testing machine; in avoiding dangerous deflections of wide extent in proving a gear; in detecting the locality of inaccuracy; and in avoiding high hub stresses. The principal benefit lies in the fact that dynamic testing of the gear is obtained with the expenditure of only a moderate amount of energy. In the same manner the relieving of the sides of the teeth of the contacting pinions to concentrate the stress on a narrow central working area is useful, but not essential.

The operation of a machine of this invention may be further explained by analyzing the manner in which forces occur in the machine shown in Figs. 1 and 2. The gear 49 acts upon the pinion 1 to move the same upwardly. This upward movement is resisted or opposed by a downward force on the shaft 3 arising out of the loading of the beam 9. From this opposing action a reaction downwardly on the teeth of the gear 13 is exerted by the teeth of the pinion 8. This reaction is conveyed through gear 13, pinion 19 and pinion 2, back to the gear 49. The loading of beam 9, therefore, results in a force opposing the rotation of gear 49 and an equal and opposite reaction aiding the rotation of gear 49. Strictly speaking, these forces are not exactly equal when rotation is taking place due to the friction of the various parts. The use of ball bearings, however, reduces this to a negligible quantity and the total amount of power to rotate gear 49 is relatively small even with ordinary bearings. In the form of apparatus shown in Figs. 4, 5, 6 and 7 a similar analysis will indicate the manner in which economy of power is obtained.

In testing for accuracy the principle of this invention actually involves the observation of a compensating movement of the shaft of one of the gears of a loop of rotating gears. Said shaft is arranged for limited movement, as, for example, shaft 3 carried by movable beam 9. If all of the gears of the loop except the gear being treated are accurate the compensating movement of shaft 9 can only be caused by inaccuracies in the gear being treated. Gear 49 may, therefore, be said to close a loop of known accuracy in which loop one of the gears has a limited degree of movement. In the other forms of apparatus of this invention this is equally true. The transverse accuracy in contrast to the peripheral accuracy of a gear may also be investigated with the apparatus of this invention. In so doing the gear being treated is held against rotation and the treating pinions are moved across the face of the gear in a direction parallel to the axis of the gear being treated by operating the proper traversing screw. The operation may then be repeated around the gear. In this way tapers and non-parallelisms and the like in the teeth will be indicated. These errors are ordinarily due to wearing of the cutters employed in cutting the gear and are consequently always present to a certain extent. For this reason it is important to know whether these errors lie within harmless limits.

Herein in the specification and claims the term "testing" is employed to mean the exploring of the dimensional characteristics of a gear; the term "proving" is employed to mean the investigation of the mechanical strength of the gear by the application thereto of stresses of known extent and intensity; the term "finishing" is used to mean the mechanical treatment of tooth surfaces to reduce the tool marks and scratches thereon and to bring about a friction-reducing smoothness.

While instances of machines of this invention have been illustrated, it is intended that the scope of Letters Patent granted hereunder be not limited thereby, but that said protection extend to the full scope of the invention as represented by the claims hereto appended.

What I claim as my invention is:

1. In an apparatus for testing, proving, and finishing gears, the combination comprising means for mounting for rotation a gear to be treated, tooth-engaging means for acting upon said gear, relatively movable means operatively connected to said tooth-engaging means, means for transmitting a selected load to said relatively movable means for communicating a force to the gear to be treated, loading means for loading said transmitting means, and measuring means for measuring relative movement of said relatively movable means.

2. In an apparatus for testing, proving, and finishing gears, the combination comprising means for mounting for rotation a gear to be treated, tooth-engaging means having a width narrower than the face of the gear being treated, said tooth-engaging means being capable of transverse movement across the face of the gear being treated, relatively movable means operatively connected to said tooth-engaging means, means for transmitting a selected load to said relatively movable means for communicating a force to the gear being treated, loading means for loading said transmitting means, and measuring means for measuring relative movement of said relatively movable means.

3. In an apparatus for testing, proving and finishing a gear, the combination comprising two pinions of less width than the width of the face of a gear to be treated meshing with said gear, means for placing a constant regulated pressure on the teeth of one of said pinions meshing with said gear in one direction and an equal and opposite pressure on the teeth of the other of said pinions meshing with said gear in the opposite direction, and means for shifting said apparatus axially of said gear and for causing said pinions while under said constant regulated pressure to contact successively all portions of all of the teeth of said gear.

4. In an apparatus for testing, proving and finishing gears, the combination comprising two pinions meshing with said gear, means for placing a constant regulated pressure on the teeth of one of said pinions meshing with said gear in one direction and an equal and opposite pressure on the teeth of the other of said pinions meshing with said gear in the opposite direction, and means for causing said pinions while under said constant regulated pressure to contact successively all portions of all of the teeth of said gear.

5. A device for testing, proving and finishing gears, comprising a testing pinion capable of meshing with a gear to be treated and having a face of predetermined width substantially less than that of the gear to be treated, a second testing pinion capable of meshing with said gear to be treated and having a face of predetermined width substantially less than that of the gear to be treated, a shaft for each of the pinions extending parallel to the shaft of the gear to be treated, transmission pinions on each of said pinion shafts, a gear mounted on a shaft parallel with the said pinion shafts and meshing with both of said transmission pinions, a pivoted support for the shaft carrying one of the testing pinions, said support being rotatable about the axis of the shaft carrying the gear which meshes with the transmission pinions, means for imposing a measured torque on said support, and means for measuring the movements thereof.

6. A device for testing, proving and finishing gears, comprising a testing pinion capable of meshing with a gear to be treated, a second testing pinion capable of meshing with said gear to be treated, a shaft for each of the pinions extending parallel to the shaft of the gear to be treated, transmission pinions on each of said pinion shafts, a gear mounted on a shaft parallel with the said pinion shafts and meshing with both of said transmission pinions, a pivoted support for the shaft carrying one of the testing pinions, said support being rotatable about the axis of the shaft carrying the gear which meshes with the transmission pinions, means for imposing a measured torque on said support, and means for measuring the movements thereof.

7. A device for testing, proving and finishing gears, comprising a testing pinion capable of meshing with a gear to be treated, a second testing pinion capable of meshing with said gear to be treated, a shaft for each of the pinions extending parallel to the shaft of the gear to be treated, transmission pinions on each of said pinion shafts, a gear mounted on a shaft parallel with the said pinion shafts and meshing with both of said transmission pinions, a linearly movable support for the shaft carrying the gear meshing with said transmission pinions, means for imposing a measured force upon said support, and means for measuring the movements thereof.

8. A device for testing, proving and finishing gears comprising a testing pinion capable of meshing with a gear to be treated, a second testing pinion capable of meshing with said gear to be treated, a shaft for each of the pinions extending parallel to the shaft of the gear to be treated, a gear mounted on a shaft parallel with the said pinion shafts and meshing with both of said testing pinions, a linearly movable support for the shaft carrying the gear meshing with said transmission pinions, means for imposing a measured force upon said support, and means for measuring the movements thereof.

HERMAN W. FALK.